US010078915B2

United States Patent
Okamoto et al.

(10) Patent No.: US 10,078,915 B2
(45) Date of Patent: Sep. 18, 2018

(54) INFORMATION TERMINAL APPARATUS, INFORMATION PROCESSING METHOD, AND SYSTEM, CONFIGURED TO CORRECT POSTURE OF A VIRTUAL OBJECT DEPENDING ON CHANGED POSTURE INFORMATION

(71) Applicants: Takuya Okamoto, Tokyo (JP); Hiroyuki Yoshida, Tokyo (JP); Rieko Ishihara, Tokyo (JP); Yuki Kawata, Tokyo (JP)

(72) Inventors: Takuya Okamoto, Tokyo (JP); Hiroyuki Yoshida, Tokyo (JP); Rieko Ishihara, Tokyo (JP); Yuki Kawata, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 372 days.

(21) Appl. No.: 14/836,175

(22) Filed: Aug. 26, 2015

(65) Prior Publication Data
US 2016/0063713 A1    Mar. 3, 2016

(30) Foreign Application Priority Data

Sep. 3, 2014  (JP) .................................. 2014-178874

(51) Int. Cl.
*G06T 19/00*    (2011.01)
*G06T 7/73*    (2017.01)

(52) U.S. Cl.
CPC .............. *G06T 19/006* (2013.01); *G06T 7/74* (2017.01); *G06T 2207/30244* (2013.01)

(58) Field of Classification Search
CPC .................. G06T 19/006; G06T 15/20; G06F 2200/1637
See application file for complete search history.

(56) References Cited

U.S. PATENT DOCUMENTS

| 2004/0021664 A1* | 2/2004 | Takemoto ............. G06T 19/006 345/419 |
| 2007/0162942 A1* | 7/2007 | Hamynen ........... G06F 17/3087 725/105 |

(Continued)

FOREIGN PATENT DOCUMENTS

| JP | 2005-260724 | 9/2005 |
| JP | 2005-267033 | 9/2005 |

*Primary Examiner* — Daniel Hajnik
(74) *Attorney, Agent, or Firm* — Cooper & Dunham LLP

(57) ABSTRACT

An apparatus includes an imaging unit for capturing a subject image; a setting unit setting initial posture of the imaging unit; a detector pirate for detecting posture information indicating a change in posture from the initial posture of the imaging unit; a corrector for correcting a posture of a preset virtual object arranged in a virtual three-dimensional space depending on the posture information; a projector for generating, based on a conversion function for projecting the virtual object on a device coordinate in a display screen of the captured image, an object image on the device coordinate, of the virtual object whose posture is corrected; a synthesizer for generating a synthetic image of the object and the captured images; a display for displaying the synthetic image; an image recording unit for recording the captured image; and a posture recording unit for recording the posture information in synchronization with the captured image.

9 Claims, 13 Drawing Sheets

(56) References Cited

U.S. PATENT DOCUMENTS

| | | | |
|---|---|---|---|
| 2008/0168404 A1* | 7/2008 | Ording | G06F 3/0485 |
| | | | 715/863 |
| 2010/0026714 A1* | 2/2010 | Utagawa | G02B 27/017 |
| | | | 345/633 |
| 2011/0221694 A1* | 9/2011 | Karaoguz | G06F 3/016 |
| | | | 345/173 |
| 2012/0105473 A1* | 5/2012 | Bar-Zeev | G02B 27/017 |
| | | | 345/633 |
| 2012/0250940 A1* | 10/2012 | Kasahara | G06F 3/011 |
| | | | 382/103 |
| 2014/0240552 A1* | 8/2014 | Kasahara | G06T 19/006 |
| | | | 348/239 |
| 2014/0247280 A1* | 9/2014 | Nicholas | G06F 3/011 |
| | | | 345/633 |
| 2015/0029218 A1* | 1/2015 | Williams | G06T 19/006 |
| | | | 345/633 |

* cited by examiner

FIG. 14

| FILE NAME OF MOVING IMAGE DATA | FILE NAME OF VIRTUAL OBJECT | LAPSE TIME | POSTURE INFORMATION | OPERATION INFORMATION | | |
|---|---|---|---|---|---|---|
| | | | | PARALLEL SHIFT AMOUNT | ROTATION AMOUNT | SCALING RATE |
| movie_1 | object_1 | $t_0$ | $(\alpha_0, \beta_0, \gamma_0)$ | $(x_0, y_0, z_0)$ | $r_0$ | $s_0$ |
| | | $t_1$ | $(\alpha_1, \beta_1, \gamma_1)$ | $(x_1, y_1, z_1)$ | $r_1$ | $s_1$ |
| | | $t_2$ | $(\alpha_2, \beta_2, \gamma_2)$ | $(x_2, y_2, z_2)$ | $r_2$ | $s_2$ |
| | | $t_3$ | $(\alpha_3, \beta_3, \gamma_3)$ | $(x_3, y_3, z_3)$ | $r_3$ | $s_3$ |
| | | ... | ... | ... | ... | ... |
| | | $t_n$ | $(\alpha_n, \beta_n, \gamma_n)$ | $(x_n, y_n, z_n)$ | $r_n$ | $s_n$ |

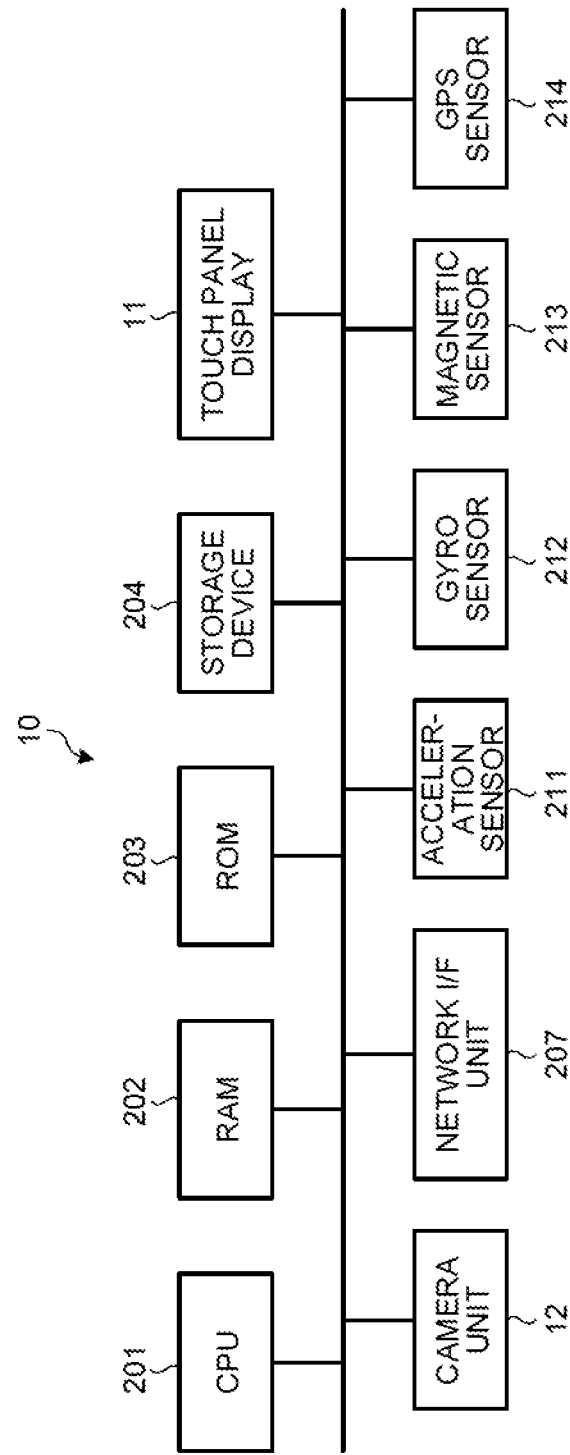

US 10,078,915 B2

INFORMATION TERMINAL APPARATUS, INFORMATION PROCESSING METHOD, AND SYSTEM, CONFIGURED TO CORRECT POSTURE OF A VIRTUAL OBJECT DEPENDING ON CHANGED POSTURE INFORMATION

CROSS-REFERENCE TO RELATED APPLICATION

The present application claims priority to and incorporates by reference the entire contents of Japanese Patent Application No. 2014-178874 filed in Japan on Sep. 3, 2014.

BACKGROUND OF THE INVENTION

1. Field of the Invention

The present invention relates to an information terminal apparatus, an information processing method, and a system.

2. Description of the Related Art

A technique called "augmented reality (AR)" in which a virtual object image is superimposed and displayed on an image captured by a camera has been known. In a conventional AR technique, a feature point, a marker, or the like on the captured image is detected and a shape or a position of the object image is changed depending on the shape and the like of the detected feature point or the marker. In the conventional AR technique, when a posture of the camera changes, the shape or the position of the object image also changes as if the object image was arranged in a real space. More information about the conventional technique can be obtained in Japanese Laid-open Patent Publication No. 2005-267033.

By the way, it is possible in the conventional AR technique to record the object image superimposed on the captured image in time series and reproduce the object image superimposed in the recording without change on the occasion of the reproduction. However, it is impossible in the conventional AR technique to replace the object image superimposed in the recording with another object image and to adjust and reset the shape or the position of the object image.

Therefore, there is a need for an information terminal apparatus, an information processing method, and a system capable of changing the shape of the object image as if the object image was arranged in the real space even by displaying another object image in place of the object image displayed in the recording and resetting the shape or the position of the object image on the occasion of reproduction.

SUMMARY OF THE INVENTION

It is an object of the present invention to at least partially solve the problems in the conventional technology.

According to an embodiment, there is provided an information terminal apparatus including: an imaging unit configured to capture an image of a subject to generate a captured image; an initial setting unit configured to set an initial posture of the imaging unit; a posture detector configured to detect posture information indicating a change in posture from the initial posture of the imaging unit; a posture corrector configured to correct a posture of a preset virtual object arranged on an object coordinate which is a virtual three-dimensional space depending on the posture information; a projector configured to generate, based on a conversion function for projecting the virtual object on a device coordinate which is a two-dimensional coordinate representing a display screen of the captured image, an object image as a result of a projection, on the device coordinate, of the virtual object whose posture is corrected; a synthesizer configured to generate a synthetic image in which the object image is synthesized with the captured image; a display unit configured to display the synthetic image; an image recording unit configured to record the captured image; and a posture recording unit configured to record the posture information in synchronization with the captured image.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 14 illustrates an example of data to be stored at the end of recording;

FIG. 16 illustrates a hardware configuration of the information terminal apparatus 10 according to the embodiment.

DETAILED DESCRIPTION OF THE PREFERRED EMBODIMENTS

An information terminal apparatus 10 according to an embodiment will be explained below.

Figure 1:
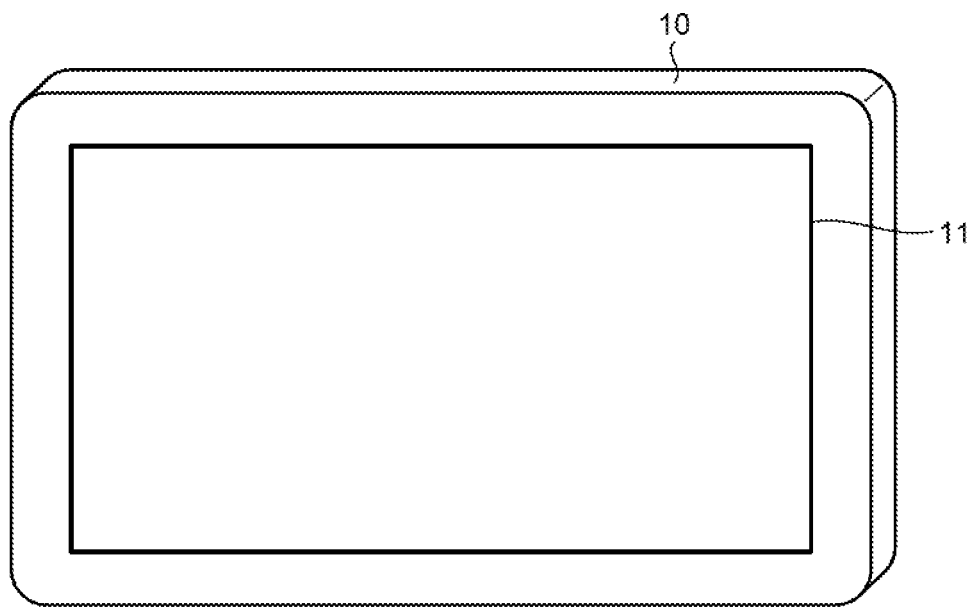
FIG. 1 is an external view seen from a front surface of an information terminal apparatus 10 according to an embodiment.
Figure 2:
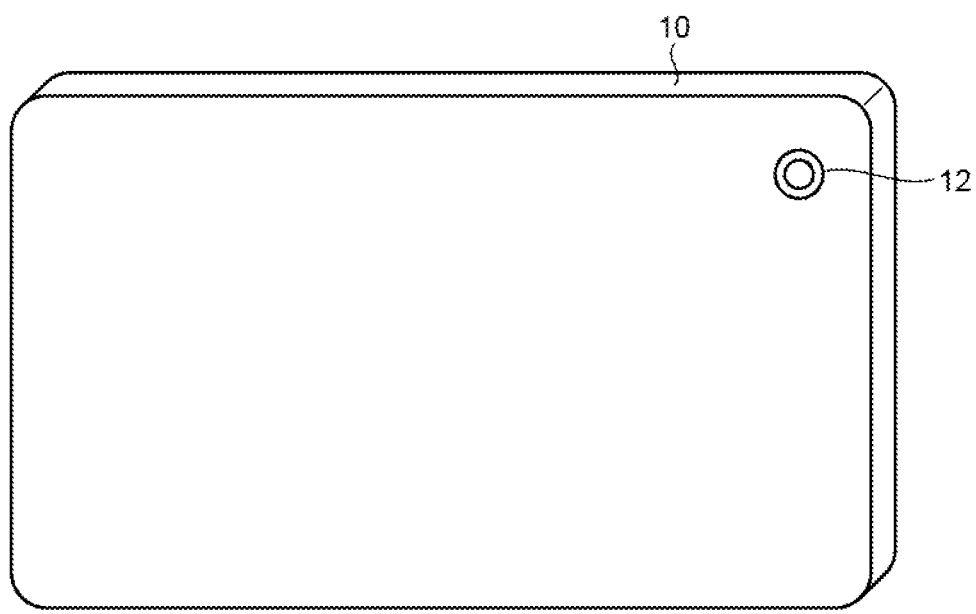
FIG. 2 is an external view seen from a rear surface of the information terminal apparatus 10 according to the embodiment.

FIG. 1 is an external view seen from a front surface of an information terminal apparatus 10 according to an embodiment. FIG. 2 is an external view seen from a rear surface of the information terminal apparatus 10 according to the embodiment.

The information terminal apparatus 10, which is a so-called tablet device, for example, has an appearance like a thin plate. The information terminal apparatus 10 is provided with a touch panel display 11 at a front surface side of the thin plate as illustrated in FIG. 1. The information terminal apparatus 10 is also provided with a camera unit 12 at a rear surface side as illustrated in FIG. 2.

The information terminal apparatus 10 may be any other devices without being limited a tablet device as long as the apparatus includes a displaying function, an inputting function, and an imaging function and is portable by a user. The information terminal apparatus 10 may be an imaging device integrally formed with a recording device, a mobile phone, a game machine, or a small computer.

Figure 3:
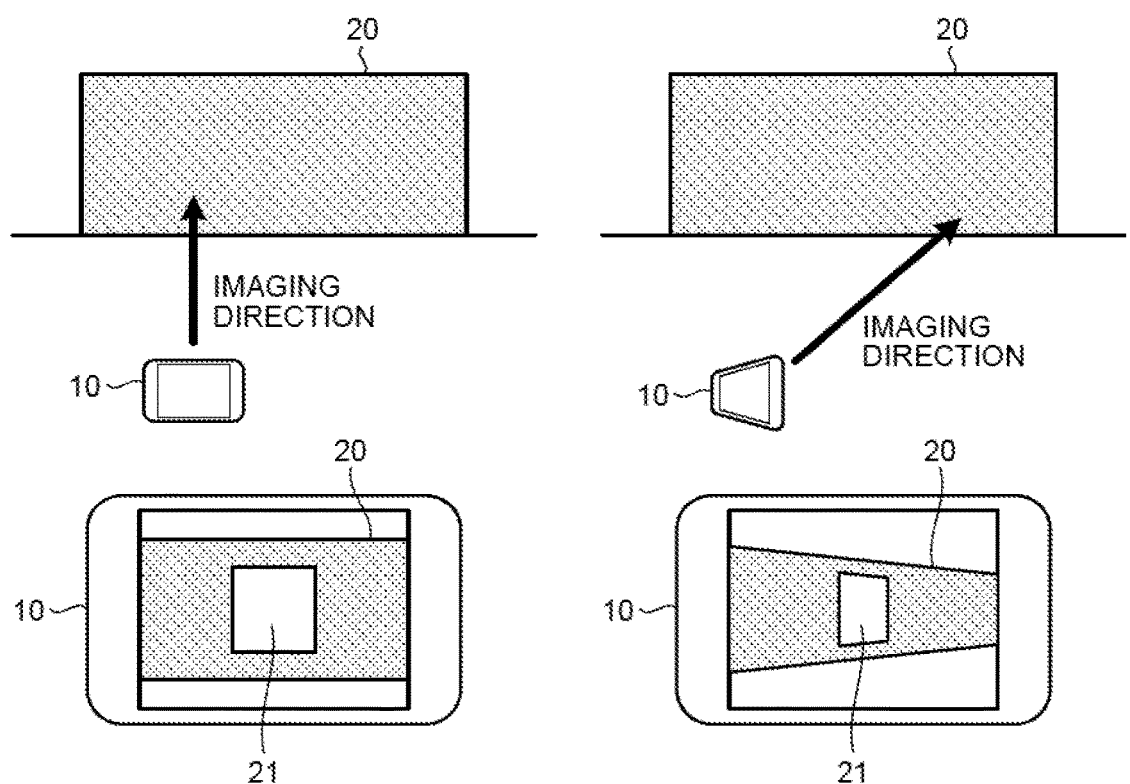
FIG. 3 illustrates a brief overview of a processing of the information terminal apparatus 10 according to the embodiment.

FIG. 3 illustrates a brief overview of a processing of the information terminal apparatus 10 according to the embodiment. The information terminal apparatus 10 superimposes and displays an object image 21 on a captured image when the captured image is being recorded and displayed or when the captured image is being only displayed (when a live view image is being displayed). The object image 21 is generated by projecting a virtual object arranged in a virtual three-dimensional space onto a two-dimensional space.

Here, the information terminal apparatus 10 changes, depending on a change in posture of the information terminal apparatus 10, the shape of the object image 21 as if an image of an object arranged in a real space was captured. For example, the information terminal apparatus 10, for example, changes the shape of the object image 21 depending on the change in the posture of the information terminal apparatus 10 as if a rectangular sheet of paper was attached on a wall 20 as illustrated in FIG. 3.

Figure 4:
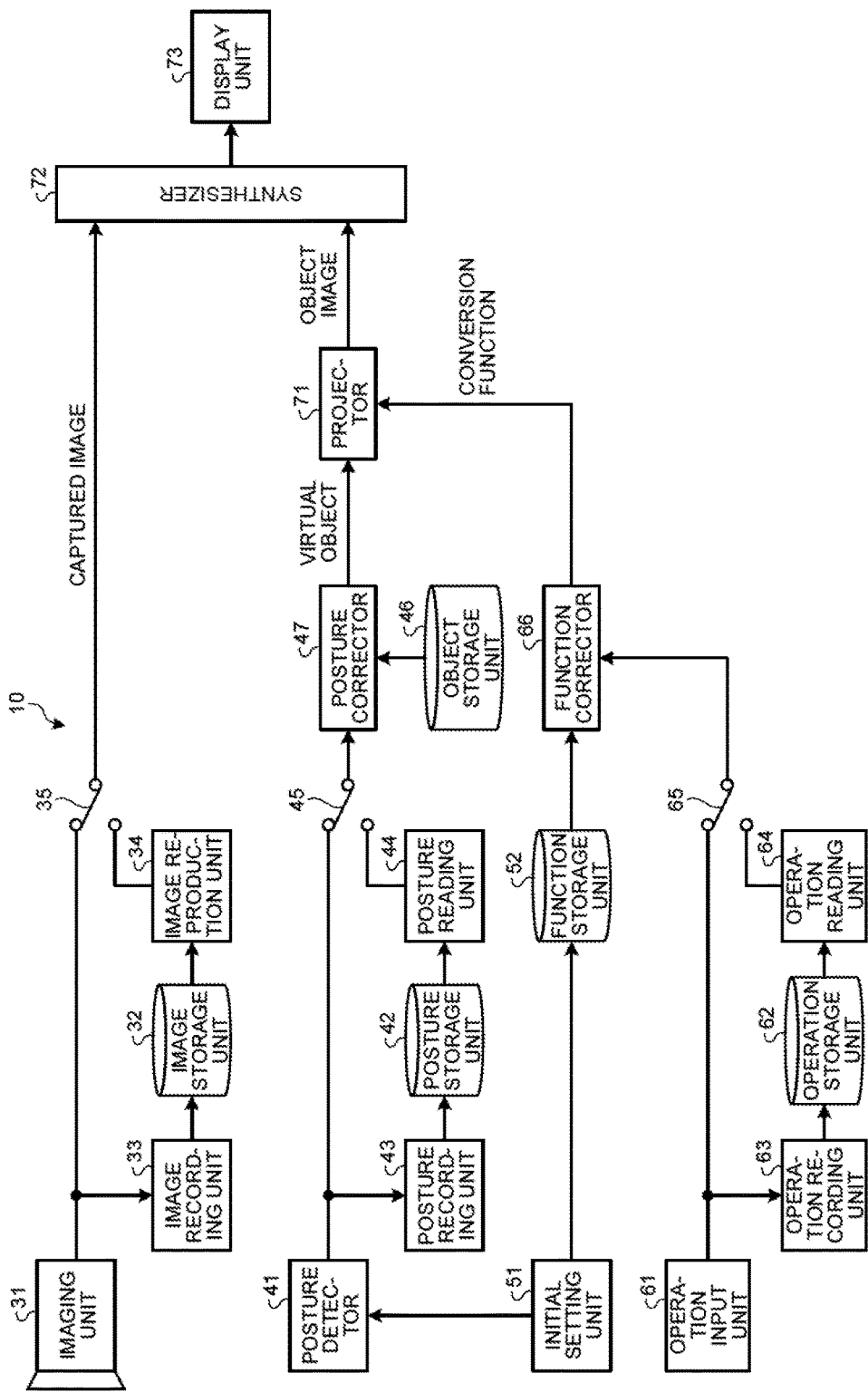
FIG. 4 illustrates a configuration of the information terminal apparatus 10 according to the embodiment.

FIG. 4 illustrates a configuration of the information terminal apparatus 10 according to the embodiment. The information terminal apparatus 10 is provided with an imaging unit 31, an image storage unit 32, an image recording unit 33, an image reproduction unit 34, an image selector 35, a posture detector 41, a posture storage unit 42, a posture recording unit 43, a posture reading unit 44, a posture selector 45, an object storage unit 46, a posture corrector 47, an initial setting unit 51, a function storage unit 52, an operation input unit 61, an operation storage unit 62, an operation recording unit 63, an operation reading unit 64, an operation selector 65, a function corrector 66, a projector 71, a synthesizer 72, and a display unit 73.

The imaging unit 31, which includes the camera unit 12, captures an image of a subject to generate a captured image. The image storage unit 32 stores the captured image. The image recording unit 33 records the captured image generated by the imaging unit 31 in the image storage unit 32. The image reproduction unit 34 reproduces the captured image stored in the image storage unit 32.

The image selector 35 provides the synthesizer 72 with a current captured image generated by the imaging unit 31 in recording or in displaying a live view image. The image selector 35 provides the synthesizer 72 with the captured image reproduced by the image reproduction unit 34 in reproduction.

The posture detector 41 detects posture information indicating a change in posture, from an initial posture, of the imaging unit 31. More specifically, the posture detector 41 detects a change in direction from an imaging direction (optical axis direction) in the initial posture of the imaging unit 31.

The posture storage unit 42 stores the posture information. The posture recording unit 43 records the posture information detected by the posture detector 41 in the posture storage unit 42 by synchronizing with the captured image recorded by the image recording unit 33. In the embodiment, the posture recording unit 43 records posture information with a lapse time from the start time of the imaging.

The posture reading unit 44 reads out the posture information stored in the posture storage unit 42 by synchronizing with the captured image reproduced by the image reproduction unit 44. In the embodiment, the posture reading unit 44 reads out posture information corresponding to a lapse time of the captured image reproduced by the image reproduction unit 34.

The posture selector 45 provides the posture corrector 47 with current posture information detected by the posture detector 41 in recording or in displaying a live view image. The posture selector 45 provides the posture corrector 47 with the posture information read out by the posture reading unit 44 in reproduction.

The object storage unit 46 stores three-dimensional data representing a three-dimensional virtual object which is arranged in an object coordinate as a virtual three-dimensional space and has a preset shape. The virtual object is arranged at a preset position in the object coordinate in a preset posture (reference posture). A picture, an illustration, a letter, and the like may be drawn on a surface of the object coordinate. The object storage unit 46 may store a plurality of virtual objects and output one virtual object selected by a user and the like.

In the embodiment, the object storage unit 46 stores a virtual object which has a picture, an illustration, a letter, and the like drawn on the front surface and has a sheet-like shape (planar rectangular shape).

The posture corrector 47 corrects the posture of the virtual object depending on the provided posture information. More specifically, the posture corrector 47 corrects the posture of the virtual object in a manner of shifting the virtual object to a direction opposite to the change in the posture of the imaging unit 31 (opposite to the change in the imaging direction of the imaging unit 31) from the reference posture.

The posture corrector 47 corrects the posture of the virtual object depending on the current posture information detected by the posture detector 41 in recording or in displaying a live view image. The posture corrector 47 corrects the posture of the virtual object depending on the posture information read out by the posture reading unit 44 in reproduction. The posture corrector 47 provides the projector 71 with the virtual object whose posture is corrected.

The initial setting unit 51 sets an initial posture of the imaging unit 31 depending on a setting operation by a user. To a user, the initial setting unit 51 displays an object image having a reference shape and a reference size on the device coordinate at the time of initial setting. The initial setting unit 51 then displays an object image having the reference shape and the reference size to allow the user to determine the posture (imaging direction) of the imaging unit 31. The initial setting unit 51 sets the posture, determined by the user, of the imaging unit 31 as an initial posture. The posture detector 41 outputs an amount of change from the initial posture determined on this occasion as posture information.

The function storage unit 52 stores a conversion function for projecting the virtual object on the device coordinate. The device coordinate is a two-dimensional coordinate representing a display screen of the captured image. The conversion function is a function of generating a reference device image to be displayed when the imaging unit 31 is in the initial posture based on the virtual object in the reference posture. When object storage unit 46 stores a plurality of virtual objects, the function storage unit 52 stores a plurality of conversion functions for respective virtual objects. In this case in the function storage unit 52, one corresponding conversion function is selected by the initial setting unit 51 at the time of the initial setting.

The operation input unit 61 inputs information of an operation with respect to the object image by the user on the device coordinate. In this embodiment, the operation input unit 61 inputs, as operation information, a parallel shift amount, a rotation amount, and a scaling rate of the object image on the device coordinate. As one example, the operation input unit 61 detects an operation (parallel shift, rotation, and scaling) with respect to the object image displayed in the touch panel display 11 to input the parallel shift amount, the rotation amount, and the scaling rate on the device coordinate.

The operation storage unit 62 stores the operation information. The operation recording unit 63 synchronizes with the captured image recorded by the image recording unit 33 records in the operation storage unit 62 the operation information input by the operation input unit 61. In this embodiment, the operation recording unit 63 records the operation information together with a lapse time from the start time of the imaging.

The operation reading unit 64 synchronizes with the captured image to be reproduced by the image reproduction unit 34 and reads out the operation information stored in the operation storage unit 62. In this embodiment, the operation reading unit 64 reads out operation information corresponding to the lapse time of the captured image to be reproduced by the image reproduction unit 34.

The operation selector 65 provides the function corrector 66 with current operation information input by the operation input unit 61 in recording or in displaying a live view image. The operation selector 65 selects one of a mode of reflecting an operation in recording and a mode of not reflecting an operation in recording based on the operation by the user on the occasion of reproduction. In the case of the mode of reflecting the operation in recording (operation reflecting mode) in reproduction, the operation selector 65 provides the function corrector 66 with the operation information read out by the operation reading unit 64. In the case of the mode of not reflecting the operation in recording (operation non-reflecting mode) in reproduction, the operation selector 65 provides the function corrector 66 with the current operation information input by the operation input unit 61.

The function corrector 66 corrects the conversion function so that the virtual object moves on the object coordinate by a shift amount depending on the operation information.

For example, the function corrector 66 converts the parallel shift amount on the device coordinate into a parallel shift amount on the object coordinate by an inverse function of the conversion function. The function corrector 66 corrects the conversion function so that the virtual object is translated by the converted parallel shift amount on the object coordinate.

In addition, the function corrector 66 corrects the conversion function so that the virtual object rotates on the object coordinate by a rotation amount on the device coordinate. Besides, the function corrector 66 corrects the conversion function so that the virtual object is scaled on the object coordinate by the scale rate on the device coordinate.

The function corrector 66 corrects the conversion function depending on the current operation information input by the operation input unit 61 in recording or in displaying a live view image. The function corrector 66 corrects the conversion function depending on the operation information read out by the operation reading unit 64 in the case of the operation reflecting mode in reproduction. The function corrector 66 corrects the conversion function depending on the current operation information input by the operation input unit 61 in the case of the operation non-reflecting mode in reproduction. The function corrector 66 provides the projector 71 with the corrected conversion function.

The projector 71 generates an object image as a result of a projection, on the device coordinate, of the virtual objet whose posture is corrected by the posture corrector 47 based on the conversion function corrected by the function corrector 66. The projector 71 provides the synthesizer 72 with the generated object image.

The synthesizer 72 generates a synthetic image in which the object image is synthesized with a captured image provided. The synthesizer 72 synthesizes the object image and the current captured image generated by the imaging unit 31 in recording or in displaying a live view image. The synthesizer 72 synthesizes the object image and the captured image reproduced by the image reproduction unit 34 in reproduction. The synthesizer 72 provides the display unit 73 with the synthetic image.

The display unit 73, which includes, for example, the touch panel display 11, displays the provided synthetic image.

Figure 5:
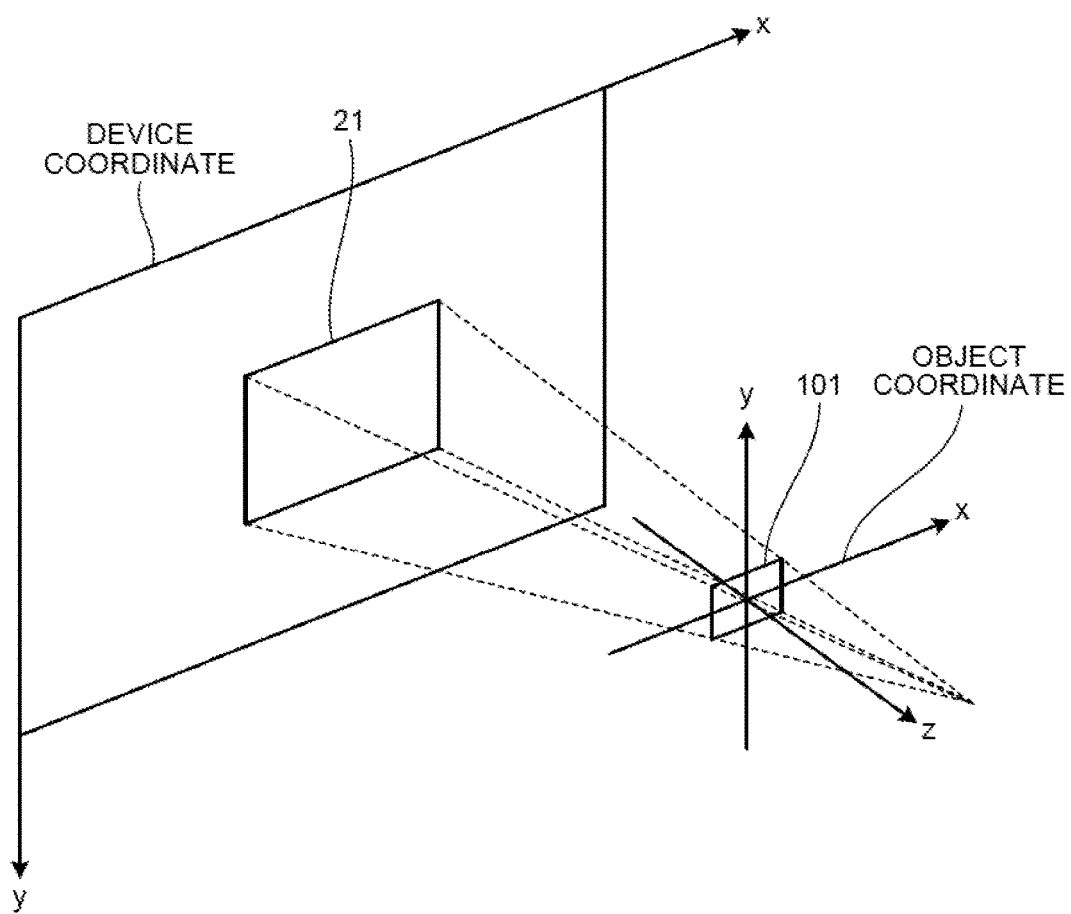
FIG. 5 is an explanatory view of a projection.

FIG. 5 is an explanatory view of the projection. In projecting a virtual object 101 arranged on the object coordinate as a three-dimensional space on the device coordinate as a two-dimensional space, it is only necessary for the information terminal apparatus 10 to obtain a two-dimensional image of the virtual object 101 seen from a given one point on the object coordinate as illustrated in FIG. 5. The function for obtaining such an image is equivalent to the conversion function and generally expressed by a matrix. In this embodiment, the three-dimensional virtual object 101 is a planar object having a rectangular shape. Therefore, a rectangular object image is projected on the device coordinate.

Figure 6:
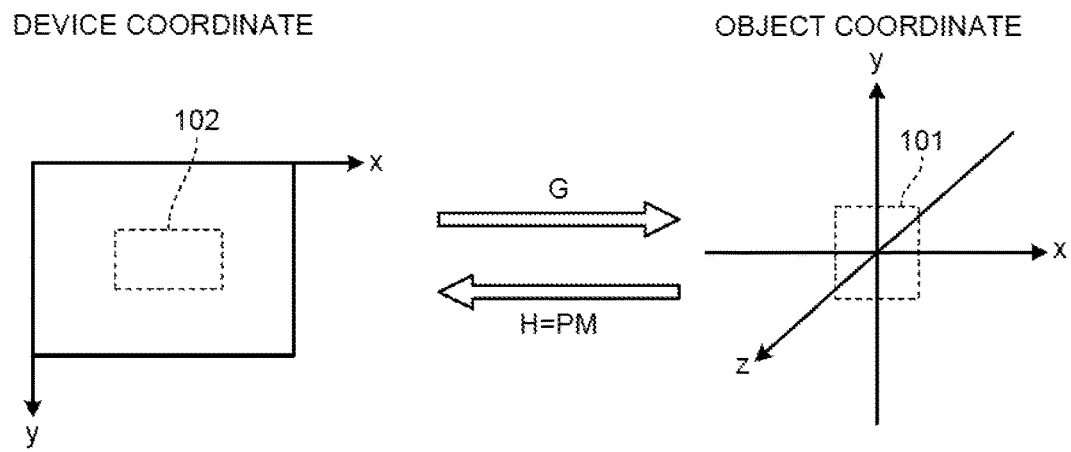
FIG. 6 is an explanatory view of an initial setting.

FIG. 6 is an explanatory view of an initial setting. The information terminal apparatus 10 sets an initial posture prior to the start of the imaging.

In this embodiment, the initial setting unit 51 arranges a reference object image 102 having a predetermined shape and size at a predetermined position on the device coordinate and allows the user to set the posture of the information terminal apparatus 10 in displaying the reference object image 102 at the time of the initial setting.

In this embodiment, the three-dimensional virtual object is a planar object having a rectangular shape and the reference object image 102 has a rectangular shape. The user depresses a decision button and the like when the information terminal apparatus 10 assumes a posture in which the reference object image 102 appears to be attached on a wall, for example.

The initial setting unit 51 then sets the posture which is assumed when the decision button and the like are depressed by the user as an initial posture. It is thereby possible for the initial setting unit 51 to set the initial posture as if the reference object image 102 was attached onto the wall.

The conversion function is calculated by a predetermined algorithm based on the position and the shape, on the device coordinate, of the reference object image 102 and the position and the shape, on the object coordinate, of the virtual object assuming the reference posture. In this embodiment, the conversion function is calculated by a predetermined algorithm based on positions, on the device coordinate, of four vertexes of the reference object image 102 and positions, on the object coordinate, of four vertexes of the virtual object assuming the reference posture. This conversion function is registered in advance.

In this embodiment, the conversion function for the projection from the object coordinate to the device coordinate is expressed by a matrix H. The matrix H is expressed by a product of a matrix P and a matrix M. The matrix P is a projection matrix and the matrix M is a matrix expressing a position and an inclination of the virtual object. An inverse function of the conversion function is expressed by a matrix G. The matrix G is an inverse matrix of the matrix H.

As explained, since setting the initial posture prior to the start of the imaging, the information terminal apparatus 10 is capable of changing the shape of the object image based on the change amount in posture from the initial posture with reference to the shape of the object image in the initial posture. In the case of the present embodiment, by setting the rectangular reference object image 102 as if the reference object image 102 was attached onto the front surface of a real wall, floor, board, and the like, the information terminal apparatus 10 is capable of changing the shape of the virtual object as if the virtual object was attached onto a real wall, floor, board, and the like.

Figure 7:
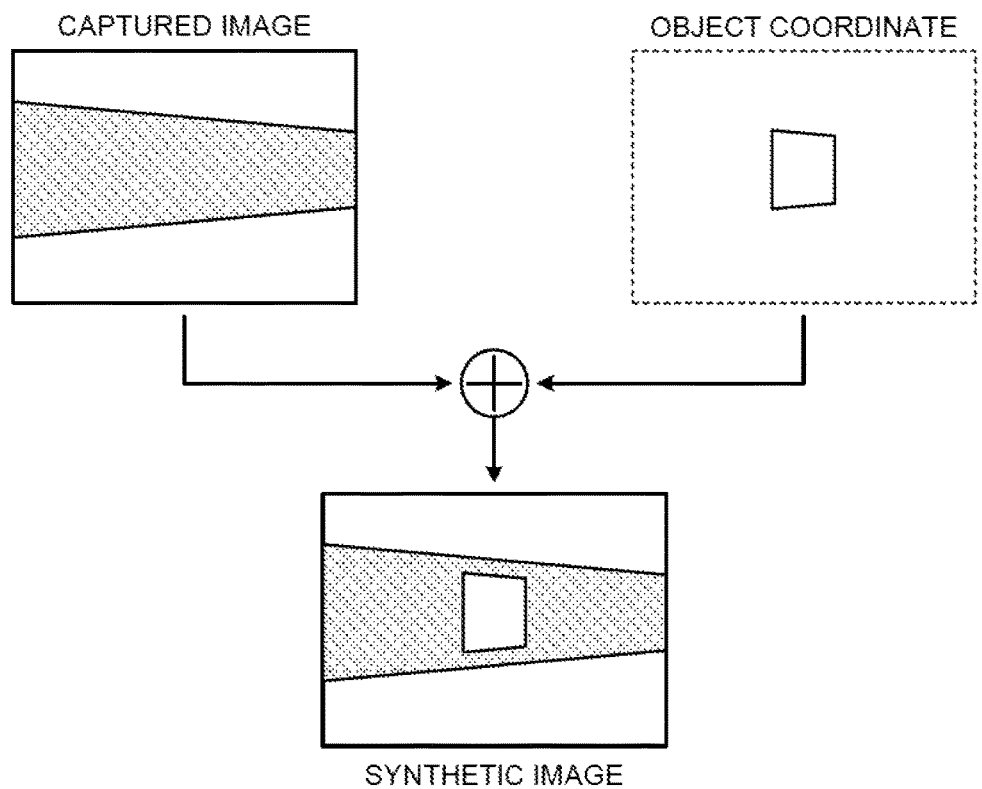
FIG. 7 is an explanatory view of a composition of a captured image and an object image.

FIG. 7 is an explanatory view of a composition of a captured image and an object image. The synthesizer 72 synthesizes the captured image and the object image to generate a synthetic image.

The synthesizer 72 superimposes the object image on the captured image to generate a synthetic image, as one example. Specifically, the synthesizer 72 treats the captured image as a background and the object image as a foreground to generate the synthetic image. In the case of this embodiment, it is thereby possible in the information terminal apparatus 10 to generate a synthetic image in which the virtual object appears to be attached on the front surface of the wall and the like.

Figure 8:
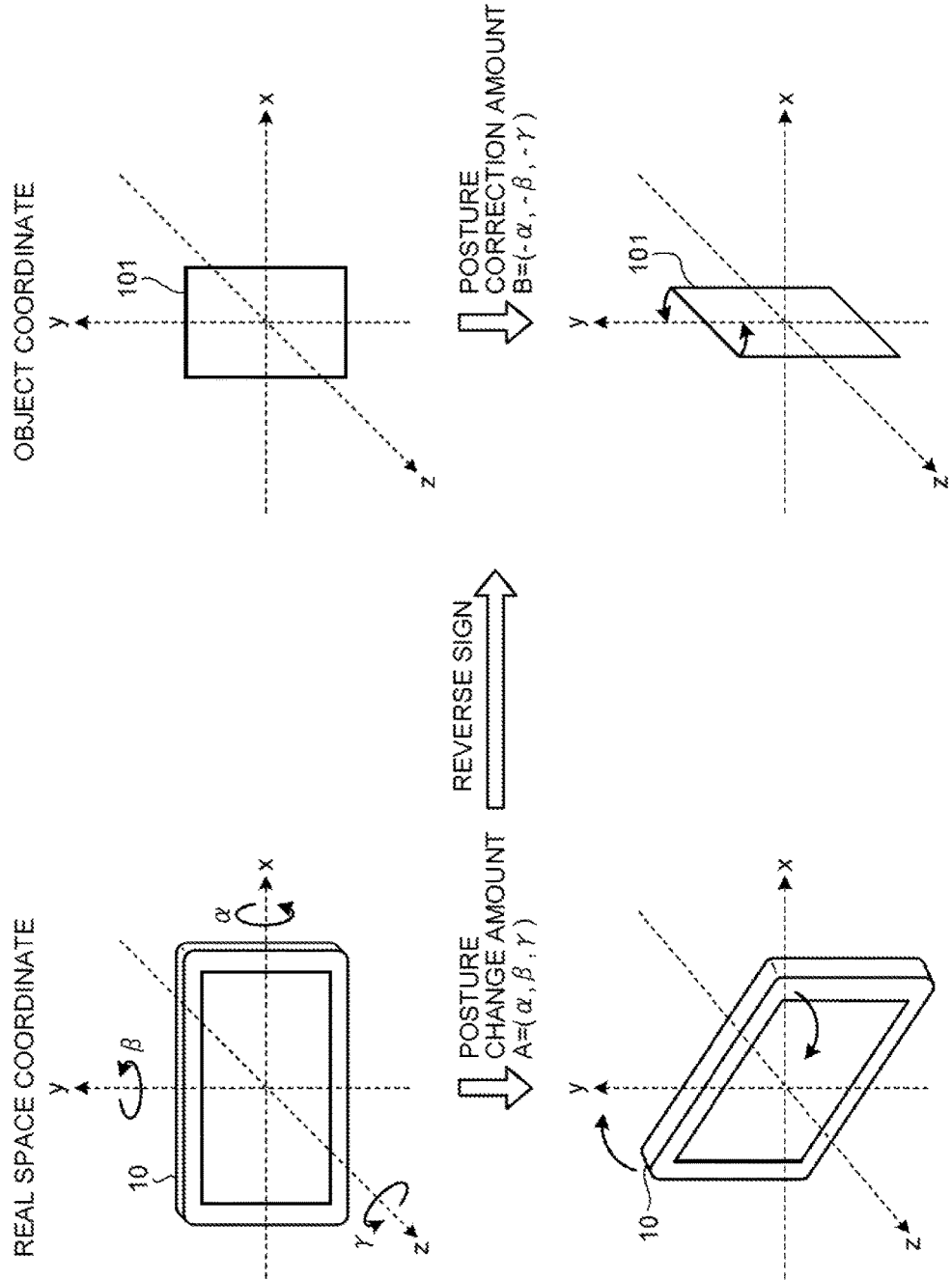
FIG. 8 is an explanatory view of a correction of a posture of a virtual object 101 depending on a posture of an imaging unit 31.

FIG. 8 is an explanatory view of a correction of the posture of the virtual object 101 depending on the posture of the imaging unit 31. The posture corrector 47 corrects the posture of the virtual object 101 in a manner of causing an opposite shift to the change in posture of the imaging unit 31 of the information terminal apparatus 10 depending on the provided posture information.

Specifically, when change amount (posture conversion amount), from the initial posture at the time of the initial setting, of the imaging unit 31 of the information terminal apparatus 10 on a real space coordinate is "A=($\alpha$, $\beta$, $\gamma$)", the posture corrector 47 rotates and corrects the posture of the virtual object 101 by a posture correction amount "B=($-\alpha$, $-\beta$, $-\gamma$)" calculated by multiplying the posture correction amount A by a reverse sign from the reference posture.

In this embodiment, the posture detector 41 detects, for posture information, a change amount, from the initial posture, in rotation angles (change amount $\alpha$ in roll angle, change amount $\beta$ in pitch angle, and change amount $\gamma$ in yaw angle) whose centers are x axis, y axis, and z axis, respectively. The posture corrector 47 then rotates the roll angle, the pitch angle, and the yaw angle of the virtual object 101 by the rotation angles ($-\alpha$, $-\beta$, $-\gamma$) of reverse sign of the posture information from the preset reference posture on the object coordinate. It is thus possible for the posture corrector 47 to correct the posture of the virtual object 101 in a manner of causing an opposite shift to the change in posture of the imaging unit 31 of the information terminal apparatus 10.

Figure 9:
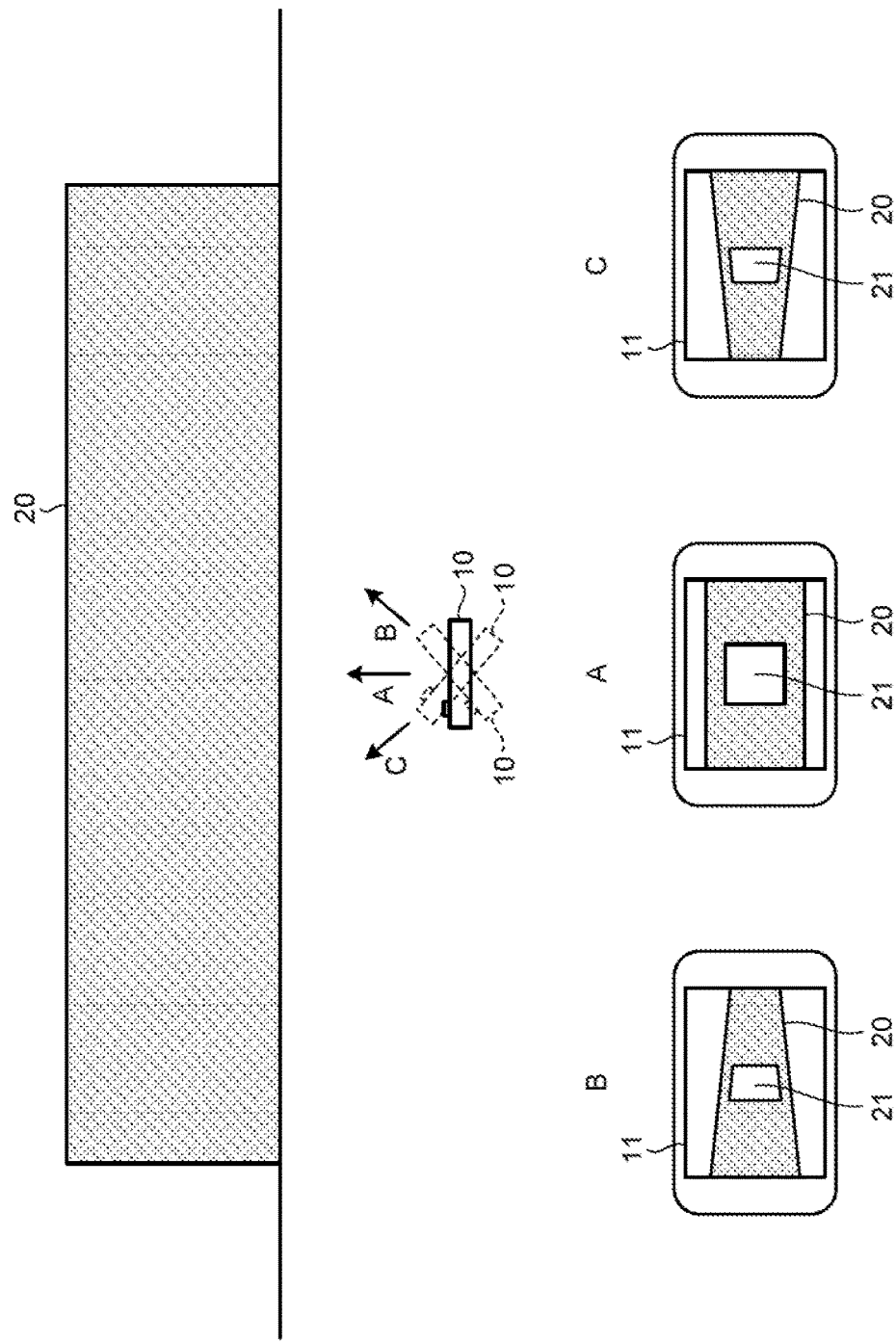
FIG. 9 illustrates a state where a shape of an object image 21 changes depending on the change of the posture of the information terminal apparatus 10.

FIG. 9 illustrates a state where the shape of an object image 21 changes depending on the change of the posture of the information terminal apparatus 10. As a result of the correction, by the posture corrector 47, of the posture of the virtual object, it is possible in the information terminal apparatus 10 to change the shape of the object image 21 having a rectangular shape so that an image of a static object appears to be captured from a different direction when there is a change in the imaging direction.

As illustrated in FIG. 9, when the virtual object is a planar object having a rectangular shape like a sheet of paper and the imaging direction is changed like A, B, and C, for example, the information terminal apparatus 10 is capable of changing the shape of the object image 21 as if the sheet was attached onto the wall 20.

Figure 10:
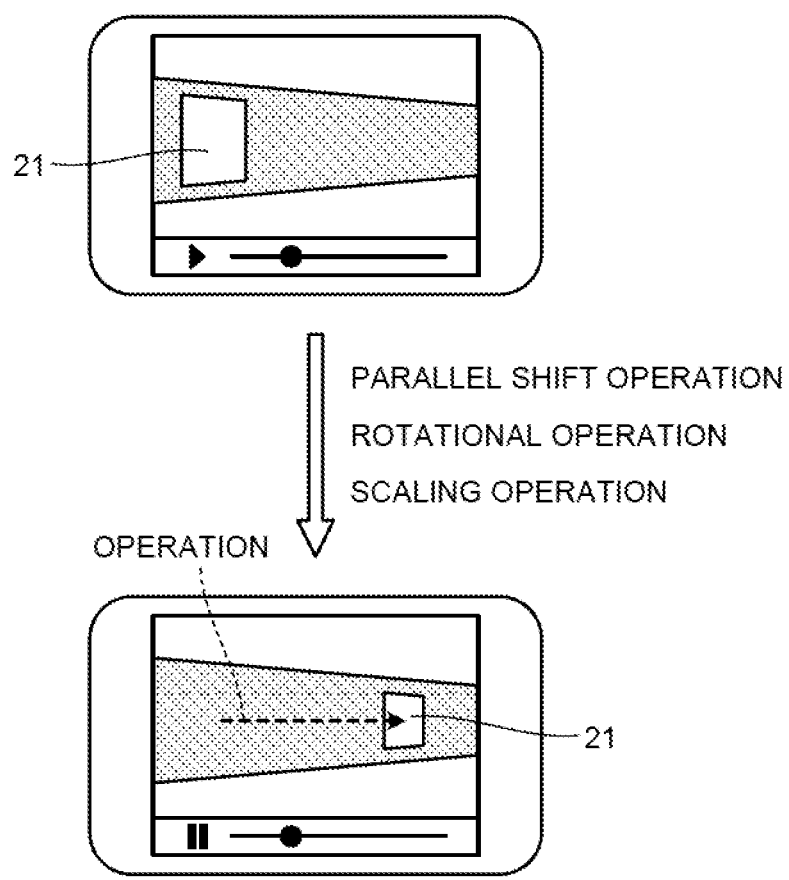
FIG. 10 is an explanatory view of an operation with respect to the object image 21.

FIG. 10 is an explanatory view of an operation with respect to the object image 21. The operation input unit 61 is capable of detecting operations (parallel shift operation, rotational operation, and scaling operation) with respect to the object image 21 displayed in the touch panel display 11 and inputting a parallel shift amount, a rotation amount, and a scaling rate on the device coordinate.

The operation input unit 61 is capable of inputting these operations in recording or in displaying a live view image. The operation input unit 61 is capable of inputting these operations also in a momentary pause in recording.

The operation input unit 61 is capable of inputting operation information in the case of the mode of not reflecting the operation in recording (operation non-reflecting mode) on the occasion of reproduction. Moreover, the operation input unit 61 is capable of inputting these operations when the reproduction is momentarily paused in the operation reflecting mode in which an operation in recording is reflected on the occasion of reproduction.

Figure 11:
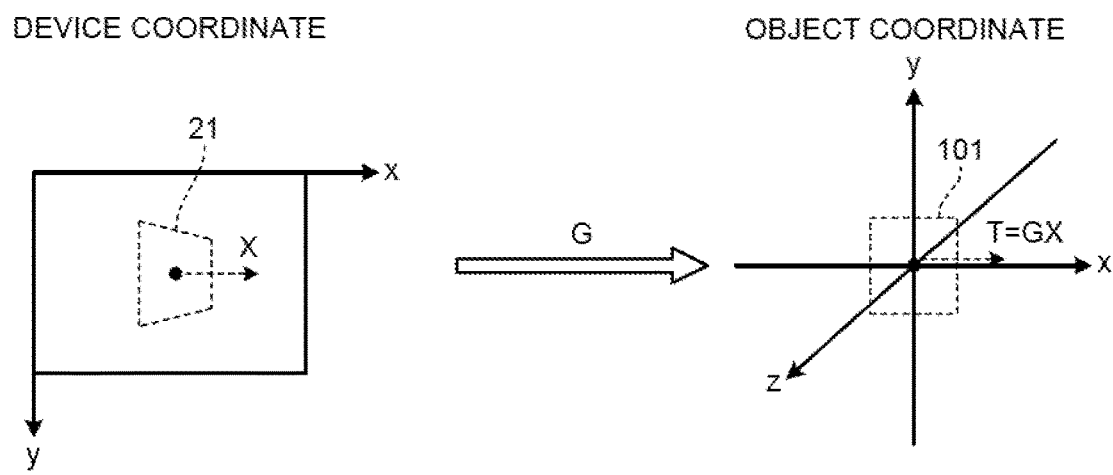
FIG. 11 is an explanatory view of a processing of converting a parallel shift amount on a device coordinate into a parallel shift amount on an object coordinate.
Figure 12:
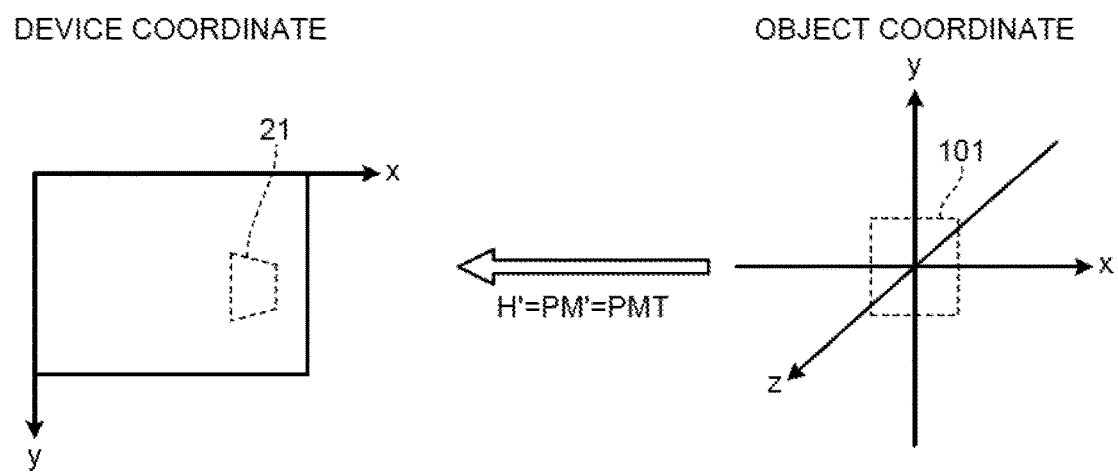
FIG. 12 is an explanatory view of a correction of a conversion function.

FIG. 11 is an explanatory view of a processing of converting the parallel shift amount on the device coordinate into the parallel shift amount on the object coordinate. FIG. 12 is an explanatory view of a correction of the conversion function.

When the parallel shift operation, the rotational operation, or the scaling operation is made, the function corrector 66 corrects the conversion function depending on operation information.

When the parallel shift operation is made, for example, the conversion function is corrected as follows. First, the function corrector 66 obtains the matrix G expressing the inverse function of the current conversion function as illustrated in FIG. 11. The matrix G is the inverse function of the matrix H. The function corrector 66 converts a matrix X expressing the parallel shift amount on the device coordinate input by the user into a matrix T expressing the parallel shift amount on the object coordinate based on the matrix G expressing the inverse function of the conversion function. Specifically, the function corrector 66 multiplies the matrix G by the matrix X to calculate the matrix T.

The function corrector 66 then corrects the matrix H expressing the conversion function in a manner of causing a parallel shift of the virtual object 101 based on the matrix T. Specifically, the function corrector 66 multiplies the matrix M expressing the position and the inclination of the virtual object 101 by the matrix T expressing the parallel shift amount to generate a matrix M'. The function corrector 66 then multiplies the matrix P by the matrix M' to generate a new matrix H'.

When the rotational operation is made, the function corrector 66 corrects the conversion function in a manner of causing a rotation of the virtual object 101 on the object coordinate by the rotation amount on the device coordinate. Specifically, the function corrector 66 rotates by the rotation amount on the device coordinate and corrects the matrix M expressing the position and the inclination of the virtual object 101 to generate a new matrix M'. The function corrector 66 then multiplies the matrix P by the matrix M' to generate a new matrix H'.

When the scaling operation is made, the function corrector 66 corrects the conversion function in a manner of scaling the virtual object 101 on the object coordinate by the scaling rate on the device coordinate. Specifically, the function corrector 66 scales by the scaling rate on the device coordinate and corrects the matrix M expressing the position and the inclination of the virtual object 101 to generate a new matrix M'. The function corrector 66 then multiplies the matrix P by the matrix M' to generate a new matrix H'.

The projector 71 projects the virtual object 101 on the device coordinate based on the new matrix H' to generate the object image 21.

Thereafter, the function corrector 66 corrects the matrix H expressing a last minute conversion function based on operation information each time when an operation is made by a user. The function corrector 66 is capable of correcting the conversion function each time when a user makes an operation in the middle of recording or reproduction of a moving image.

Figure 13:
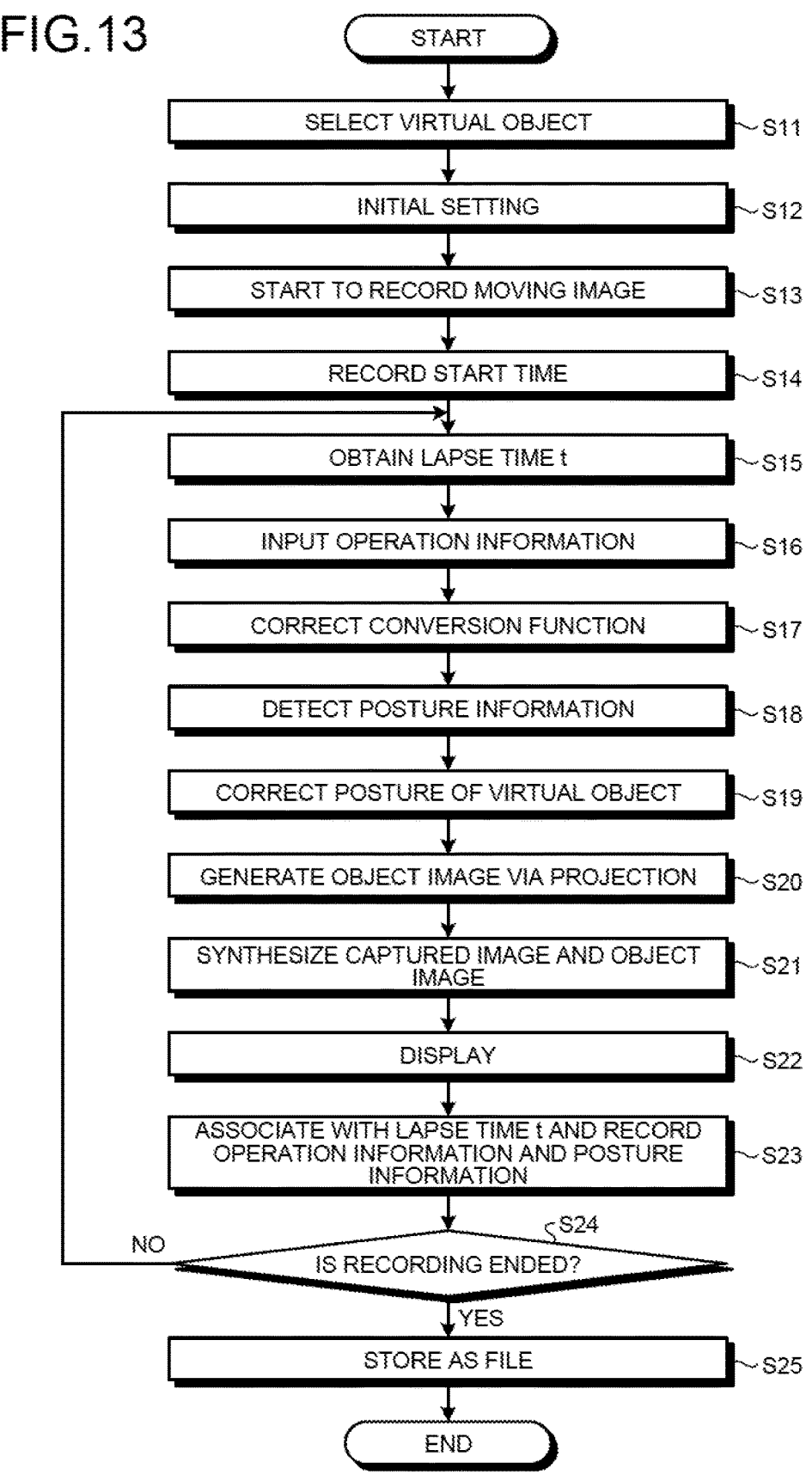
FIG. 13 illustrates a flow of a processing of the information terminal apparatus 10 in recording.

FIG. 13 illustrates a flow of a processing of the information terminal apparatus 10 in recording. The information terminal apparatus 10 starts a processing from step S11 in recording a moving image.

First at step S11, the information terminal apparatus 10 receives a selection of a virtual object. The information terminal apparatus 10 may present a plurality of virtual objects to the user and receive a selection of any one of the virtual objects.

Then at step S12, the information terminal apparatus 10 obtains a conversion function corresponding to the selected virtual object and also sets the initial posture. Then at step S13, the information terminal apparatus 10 receives an instruction of starting recording from a user to start recording a moving image. Then at step S14, the information terminal apparatus 10 records a time of the start of the recording.

When the recording of a moving image is started, the information terminal apparatus 10 executes the processing from step S15 to step S24 at regular time intervals (every one frame period of time, for example).

At step S15, the information terminal apparatus 10 obtains a lapse time t from the recording start time. Then at step S16, the information terminal apparatus 10 inputs operation information. Then at step S17, the information terminal apparatus 10 corrects the conversion function based on the input operation information. Here, the information terminal apparatus 10 does not correct the conversion function when operation information is not input.

Then at step S18, the information terminal apparatus 10 detects posture information. Then at step S19, the information terminal apparatus 10 corrects the posture of the virtual object arranged on the object coordinate which is a virtual three-dimensional space based on the detected posture information.

Then at step S20, the information terminal apparatus 10 uses the conversion function to project the virtual object arranged on the object coordinate onto the device coordinate which is a two-dimensional space in which a captured image is to be arranged and generate an object image.

Then at step S21, the information terminal apparatus 10 synthesizes the captured image and the object image to generate a synthetic image. Then at step S22, the information terminal apparatus 10 displays the synthetic image.

Then at step S23, the information terminal apparatus 10 associates with the lapse time t and records the operation information input at step S16 and the posture information detected at step S18. Then at step S24, the information terminal apparatus 10 determines whether or not the recording is ended. When the recording is not ended ("No" at step S24), the information terminal apparatus 10 increases the lapse time t by one frame, for example, and returns the processing to step S15. When the processing is returned to step S15, the information terminal apparatus 10 repeats the processing from step S15 with respect to the lapse time t advancing by one frame.

When the recording is ended ("Yes" at step S24), the information terminal apparatus 10 causes the processing to go to step S25. At step S25, the information terminal apparatus 10 stores, as a file, the moving image data, the virtual object, the posture information for each lapse time t, and the operation information for each lapse time t. When step S25 is ended, the information terminal apparatus 10 ends this flow.

FIG. 14 illustrates an example of data to be stored at the end of the recording. The information terminal apparatus 10 stores, as a file, the data as illustrated in FIG. 14 at the end of the recording.

Specifically, the information terminal apparatus 10 stores a file name of the moving image data and a file name of the virtual object.

The information terminal apparatus 10 also stores the posture information indicated by change amount in the roll angle $\alpha$, the pitch angle $\beta$, and the yaw angle $\gamma$ for each lapse time t. Besides, the information terminal apparatus 10 stores the operation information including the parallel shift amount (x, y, z), the rotation amount r, and the scaling rate s for each lapse time t.

Figure 15:
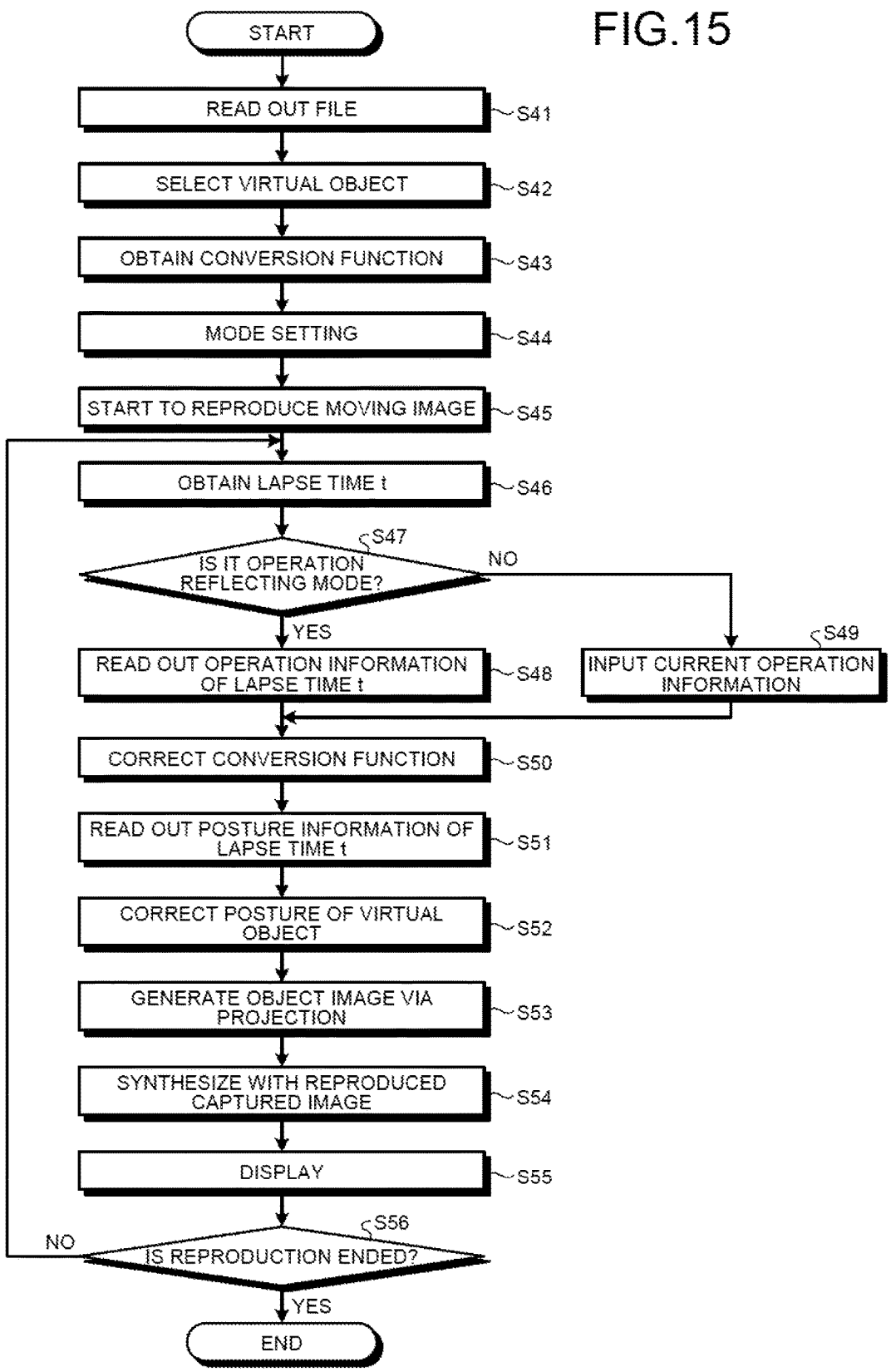
FIG. 15 illustrates a flow of a processing of the information terminal apparatus 10 in reproduction.

FIG. 15 illustrates a flow of a processing of the information terminal apparatus 10 in reproduction. The information terminal apparatus 10 starts the processing from step S41 in reproducing a moving image.

First at step S41, the information terminal apparatus 10 reads out the recorded file. At step S42, the information terminal apparatus 10 selects a virtual object. In this case, the information terminal apparatus 10 may select a virtual object stored in a file in recording or may select another virtual object.

Then at step S43, the information terminal apparatus 10 obtains a conversion function corresponding to the selected virtual object. Then at step S44, the information terminal apparatus 10 sets one of the mode of reflecting an operation in recording (the operation reflecting mode) and the mode of not reflecting an operation in recording (the operation non-reflecting mode) in accordance with the selection by the user.

Then at step S45, the information terminal apparatus 10 receives an instruction of starting reproduction from the user and starts reproduction of the moving image stored in the file.

When the reproduction of the moving image is started, the information terminal apparatus 10 executes the processing from step S46 to step S56 at a regular time intervals (every one frame period of time, for example).

At step S46, the information terminal apparatus 10 obtains the lapse time t from the recording start time of the moving image. Then at step S47, the information terminal apparatus 10 determines an operation mode. In the case of the operation reflecting mode ("YES" at step S47), the information terminal apparatus 10 reads out the operation information of the lapse time t from the file at step S48. In the case of the operation non-reflecting mode ("No" at step S47), the information terminal apparatus 10 inputs the current operation information at step S49. Here, even in the case of the operation reflecting mode, the information terminal apparatus 10 may input the current operation information as long as the operation is in a momentary pause.

When the processing at step S48 or step S49 is ended, the information terminal apparatus 10 corrects the conversion function based on the operation information at step S50.

Next at step S51, the information terminal apparatus 10 reads out the posture information of the lapse time t from the file. Then at step S52, the information terminal apparatus 10 corrects the posture of the virtual object arranged on the object coordinate as a virtual three-dimensional space based on the read posture information.

Then at step S53, the information terminal apparatus 10 uses the conversion function to project the virtual object arranged on the object coordinate onto the device coordinate as a two-dimensional space in which the captured image is to be arranged and generate an object image.

Then at step S54, the information terminal apparatus 10 synthesizes the captured image reproduced and the object image to generate a synthetic image. Then at step S55, the information terminal apparatus 10 displays the synthetic image.

Then at step S56, the information terminal apparatus 10 determines whether or not the reproduction is ended. When the reproduction is not ended ("No" at step S56), the information terminal apparatus 10 increases the lapse time t by one frame, for example, and returns the processing to step S46. When the processing is returned to step S46, the information terminal apparatus 10 repeats the processing from step S46 with respect to the lapse time t advancing by one frame.

When the reproduction is ended ("Yes" at step S56), the information terminal apparatus 10 ends this flow.

As explained so far, the information terminal apparatus 10 according to the embodiment corrects the posture of the virtual object depending on the posture of the imaging unit 31. It is thereby possible to change the shape of the object image obtained by projecting the virtual object as if the virtual object was arranged in a real space even when the posture of the imaging unit 31 changes.

The information terminal apparatus 10 records, by synchronizing with the captured image, the posture information. It is thereby possible according to the information terminal apparatus 10 to change the shape of the virtual object as if the virtual object was arranged in the real space even in reproduction. In this case, not a two-dimensional object image after projection but posture information is recorded by being synchronized with the captured image, it is possible in the information terminal apparatus 10 to change, even when the original virtual object is changed to another virtual object, the shape of the virtual object after change as if the changed virtual object was arranged in the real space.

Besides, it is possible in the information terminal apparatus 10 to record, by synchronizing with a captured image, operation information for operating the arrangement of the virtual object and select whether or not the operation information in the recording is to be reflected on the occasion of reproduction. It is then possible in the information terminal apparatus 10 to arrange the virtual object at a position different from the position in the recording through a current operation (an operation input in the reproduction) when the operation information in the recording is not reflected.

Since posture information is recorded by being synchronized with a captured image, it is possible in the information terminal apparatus 10 to change the shape of the virtual object as if the virtual object was arranged in the real space even by arranging, on the occasion of the reproduction, the virtual object at a display position different from the display position in the recording.

Hardware Configuration

FIG. 16 illustrates a hardware configuration of the information terminal apparatus 10.

The information terminal apparatus 10 according to the embodiment is realized by a hardware configuration as illustrated in FIG. 16, for example. The information terminal apparatus 10 is provided with a CPU (Central Processing Unit) 201, a RAM (Random Access Memory) 202, a ROM (Read Only Memory) 203, a storage device 204, the touch panel display 11, the camera unit 12, a network I/F unit 207, an acceleration sensor 211, a gyro sensor 212, a magnetic sensor 213, and a GPS (Global Positioning System) sensor 214. These units are connected by a bus.

The CPU 201 is a processor that executes a calculation processing, a control processing, and the like in accordance with a program. The CPU 201 uses a predetermined area of the RAM 202 as a work area and executes processing of various kinds in cooperation with programs stored in the ROM 203 and the storage device 204.

The RAM 202 is a memory such as an SDRAM (Synchronous Dynamic Random Access Memory). The RAM 202 functions as a work area of the CPU 201. The ROM 203 is a memory that stores programs and information of various kinds in such a manner that rewriting is disabled.

The storage device 204 is a device that writes and reads out data in and from a semiconductor storage medium such as a flash memory or a storage medium capable of a magnetic recording or an optical recording. The storage device 204 writes and reads out in and from the storage medium depending on the control by the CPU 201.

The touch panel display 11 is a device that displays information in a display depending on the control of the CPU 201 and allows inputting information of an operation with respect to the display. The camera unit 12 is a device that captures an image of a subject and generates a moving image signal. The network I/F 207 communicates with an external device via a network depending on the control by the CPU 201.

The acceleration sensor 211 detects an acceleration of the information terminal apparatus 10 and an acceleration direction. The gyro sensor 212 detects the posture of the information terminal apparatus 10. The magnetic sensor 213 detects a direction to which the information terminal apparatus 10 is oriented. The GPS sensor 214 detects a position (latitude, longitude, and altitude) of the information terminal apparatus 10.

A program to be executed in the information terminal apparatus 10 according to the embodiment has a module configuration including an imaging module, an image storage module, an image recording module, an image reproduction module, an image selection module, a posture detecting module, a posture storage module, a posture recording module, a posture reading module, a posture selection module, an object storage module, a posture correction module, an initial setting module, a function storage module, an operation input module, an operation storage module, an operation recording module, an operation reading module, an operation selection module, a function correction module, a projection module, a composite module, and a display module. The program is expanded on the RAM 202 and executed by the CPU 201 (processor), so that the information terminal apparatus 10 functions as the imaging unit 31, the image storage unit 32, the image recording unit 33, the image reproduction unit 34, the image selector 35, the posture detector 41, the posture storage unit 42, the posture recording unit 43, the posture reading unit 44, the posture selector 45, the object storage unit 46, the posture corrector 47, the initial setting unit 51, the function storage unit 52, the operation input unit 61, the operation storage unit 62, the operation recording unit 63, the operation reading unit 64, the operation selector 65, the function corrector 66, the projector 71, the synthesizer 72, and the display unit 73.

The information terminal apparatus 10 is not limited to this configuration and may have a configuration in which at least a part of those constituents is realized by a hardware circuit (a semiconductor integrated circuit, for example). For example, the imaging unit 31 may have a configuration realized by the camera unit 12 and an imaging module. The posture detector 41 may have a configuration realized by at least one of the acceleration sensor 211, the gyro sensor 212, the magnetic sensor 213, and the GPS (Global Positioning System) sensor 214 and a posture detection module.

The program to be executed in the information terminal apparatus 10 according to the embodiment is provided by being recorded in a file of an installable format or of an executable format in a computer-readable recording medium such as a CD-ROM, a flexible disk, a CD-R, and a DVD (Digital Versatile Disk).

The program to be executed in the information terminal apparatus 10 according to the embodiment may be provided by being stored on a computer connected to a network such as the Internet and downloaded via the network. The program to be executed in the information terminal apparatus 10 according to the embodiment may be provided or distributed via a network such as the Internet. The program to be executed in the information terminal apparatus 10 according to the embodiment may be provided by being preloaded in a ROM and the like.

The same configuration as the information terminal apparatus 10 according to the embodiment may be realized by a system provided with a terminal device and an information processing device which is connectable to the terminal device via a network. In this case, the terminal device and the information processing device execute a processing while exchanging data via the network. In the system provided with the terminal device and the information processing device, the terminal device functions as the imaging unit 31, the posture detector 41, the operation input unit 61, and the display unit 73, for example. Then, the information processing device functions as the image storage unit 32, the image recording unit 33, the image reproduction unit 34, the image selector 35, the posture storage unit 42, the posture recording unit 43, the posture reading unit 44, the posture selector 45, the object storage unit 46, the posture corrector 47, the initial setting unit 51, the function storage unit 52, the operation storage unit 62, the operation recording unit 63, the operation reading unit 64, the operation selector 65, the function corrector 66, the projector 71, and the synthesizer 72. Here, a part of the functions of the information processing device may be executed by the terminal device.

According to the embodiment, there is an advantage in that the shape of an object image can be changed as if the object image was arranged in the real space even by displaying another object image in place of the object image displayed in recording and resetting the shape or the position of the object image on the occasion of reproduction.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information terminal apparatus comprising:
an imager configured to capture an image of a subject to generate a captured image;
a display configured to display the captured image;
a posture detector configured to detect changed posture information indicating a change in posture of the imager;
processing circuitry configured to
generate, based on a conversion function for projecting a preset virtual object arranged on an object coordinate which is a virtual three-dimensional space on a device coordinate which is a two-dimensional coordinate representing a display screen of the captured image, a reference object image as a result of a projection, on the device coordinate,
generate a reference synthetic image in which the reference object image is synthesized with the captured image,
store an initial posture of the imager in response to user operation with the reference synthetic image being displayed on the display,
record the changed posture information indicating a change, detected by the posture detector, in posture of the imager from the initial posture in synchronization with the captured image,
correct a posture of the virtual object depending on the changed posture information,
generate, based on the conversion function, an object image as a result of a projection, on the device coordinate, of the virtual object whose posture has been corrected,
generate a synthetic image in which the captured image is synthesized with the object image,
display on the display the synthetic image including the captured image synthesized with the object image of the virtual object whose posture has been corrected,
reproduce the captured image,
synchronize with the captured image and read out the changed posture information recorded,
correct the posture of the virtual object depending on the changed posture information read out during the reproduction,
generate the synthetic image in which the object image is synthesized with the reproduced captured image,
receive operation information with respect to the object image from a user on the device coordinate,
synchronize with the captured image and record the operation information,
correct the conversion function so that the virtual object is shifted on the object coordinate by a shift amount depending on the operation information, wherein the object image is generated based on the corrected conversion function,
synchronize with the captured image and read out the operation information recorded, wherein the conversion function is corrected depending on the operation information read out during the reproduction, select one of a mode of reflecting an operation in recording and a mode of not reflecting an operation in recording based on an operation by the user during the reproduction, correct the conversion function depending on the read out operation information in a case of the mode of reflecting the operation in recording, and correct the conversion function depending on current operation information input by the user in a case of the mode of not reflecting the operation in recording.

2. The information terminal apparatus according to claim 1, wherein the conversion function serves to generate, from the virtual object assuming a reference posture, a reference device image to be displayed when the imager assumes the initial posture, and the processing circuitry is further configured to correct the posture of the virtual object in a manner of causing an opposite shift to the change in posture of the imager.

3. The information terminal apparatus according to claim 2, wherein the changed posture information is indicated by a change amount in roll angle, a pitch angle, and a yaw angle from the initial posture, and the processing circuitry is further configured to rotate from the reference posture, the virtual object by rotation angles in the roll angle, the pitch angle, and the yaw angle of reverse sign of the changed posture information.

4. The information terminal apparatus according to claim 1, wherein the processing circuitry is further configured to receive a parallel shift amount of the object image on the device coordinate as the operation information, and convert the parallel shift amount on the device coordinate into a parallel shift amount on the object coordinate by an inverse function of the conversion function and corrects the conversion function in a manner of causing a parallel shift of the virtual object by the converted parallel shift amount on the object coordinate.

5. The information terminal apparatus according to claim 1, wherein the processing circuitry is further configured to receive a rotation amount of the object image on the device coordinate as the operation information, and correct the conversion function in a manner of causing a rotation of the virtual object on the object coordinate by the rotation amount on the device coordinate.

6. The information terminal apparatus according to claim 1, wherein the processing circuitry is further configured to receive a scaling rate of the object image on the device coordinate as the operation information, and correct the conversion function in a manner of scaling the virtual object on the object coordinate by the scaling rate on the device coordinate.

7. The information terminal apparatus according to claim 1, wherein the virtual object is a planar object having a rectangular shape, and the object image has a rectangular shape.

8. An information processing method, comprising:

capturing an image of a subject by an imager to generate a captured image;

displaying the captured image on a display;

detecting, by a posture detector, changed posture information indicating a change in posture of the imager;

generating, based on a conversion function for projecting a preset virtual object arranged on an object coordinate which is a virtual three-dimensional space on a device coordinate which is a two-dimensional coordinate representing a display screen of the captured image, a reference object image as a result of a projection, on the device coordinate, generating a reference synthetic image in which the object image is synthesized with the captured image, storing an initial posture of the imager in response to user operation with the reference synthetic image being displayed on the display, recording the changed posture information indicating a change, detected by the posture detector, in posture of the imager from the initial posture in synchronization with the captured image, correcting a posture of the virtual object depending on the changed posture information, generating, based on the conversion function, an object image as a result of a projection, on the device coordinate, of the virtual object whose posture has been corrected, generating a synthetic image in which the captured image is synthesized with the object image, displaying on the display the synthetic image including the captured image synthesized with the object image of the virtual object whose posture has been corrected, reproducing the captured image, synchronizing with the captured image and reading out the changed posture information recorded, correcting the posture of the virtual object depending on the changed posture information read out during the reproduction, generating the synthetic image in which the object image is synthesized with the reproduced captured image, receiving operation information with respect to the object image from a user on the device coordinate, synchronizing with the captured image and recording the operation information, correcting the conversion function so that the virtual object is shifted on the object coordinate by a shift amount depending on the operation information, wherein the object image is generated based on the corrected conversion function, synchronizing with the captured image and reading out the operation information recorded, wherein the conversion function is being corrected depending on the operation information read out during the reproduction, selecting one of a mode of reflecting an operation in recording and a mode of not reflecting an operation in recording based on an operation by the user during the reproduction, correcting the conversion function depending on the read out operation information in a case of the mode of reflecting the operation in recording, and correcting the conversion function depending on current operation information input by the user in a case of the mode of not reflecting the operation in recording.

9. A system comprising:

a terminal device;

an information processing device connectable to the terminal device via a network;

an imager configured to capture an image of a subject to generate a captured image;

a display configured to display the captured image;

a posture detector configured to detect changed posture information indicating a change in posture of the imager;

processing circuitry configured to
  generate, based on a conversion function for projecting a preset virtual object arranged on an object coordinate which is a virtual three-dimensional space on a device coordinate which is a two-dimensional coordinate representing a display screen of the captured image, a reference object image as a result of a projection, on the device coordinate
  generate a reference synthetic image in which the reference object image is synthesized with the captured image;
  store an initial posture of the imager in response to a user operation with the reference synthetic image being displayed on the display;
  record the changed posture information indicating a change, detected by the posture detector, in posture of the imager from the initial posture in synchronization with the captured image;
  correct a posture of the virtual object depending on the changed posture information;
  generate, based on the conversion function, an object image as a result of a projection, on the device coordinate, of the virtual object whose posture has been corrected;
  generate a synthetic image in which the captured image is synthesized with the object image,
  display on the display the synthetic image including the captured image synthesized with the object image of the virtual object whose posture has been corrected,
  reproduce the captured image,
  synchronize with the captured image and read out the changed posture information recorded,
  correct the posture of the virtual object depending on the changed posture information read out during the reproduction,
  generate the synthetic image in which the object image is synthesized with the reproduced captured image,
  receive operation information with respect to the object image from a user on the device coordinate,
  synchronize with the captured image and record the operation information,
  correct the conversion function so that the virtual object is shifted on the object coordinate by a shift amount depending on the operation information, wherein the object image is generated based on the corrected conversion function,
  synchronize with the captured image and read out the operation information recorded, wherein the conversion function is corrected depending on the operation information read out during the reproduction,
  select one of a mode of reflecting an operation in recording and a mode of not reflecting an operation in recording based on an operation by the user during the reproduction,
  correct the conversion function depending on the read out operation information in a case of the mode of reflecting the operation in recording, and
  correct the conversion function depending on current operation information input by the user in a case of the mode of not reflecting the operation in recording.

* * * * *